United States Patent [19]

Takehara et al.

[11] Patent Number: 5,749,935
[45] Date of Patent: May 12, 1998

[54] MANGANESE FERTILIZER

[75] Inventors: Hisao Takehara, Tokyo; Ryoichi Shimizugawa; Toshihiko Tokai, both of Takaoka, all of Japan

[73] Assignee: Japan Metals & Chemicals Co., Ltd., Tokyo, Japan

[21] Appl. No.: 286,194

[22] Filed: Aug. 8, 1994

[30] Foreign Application Priority Data

May 25, 1994 [JP] Japan ................................. 6-111458

[51] Int. Cl.$^6$ .................................................. C05D 1/00
[52] U.S. Cl. .......................................... 71/62; 71/63
[58] Field of Search ................................ 71/62, 63, 1

[56] References Cited

U.S. PATENT DOCUMENTS 5,085,681  2/1992  Boukidis ................................. 71/62

5,354,350  10/1994  Moore ................................. 71/24

FOREIGN PATENT DOCUMENTS 7136164  5/1967  Japan ................................. 71/1

*Primary Examiner*—Ferris Lander
*Attorney, Agent, or Firm*—Oliff & Berridge, PLC

[57] ABSTRACT

Manganese byproducts produced in the course of manufacturing electrolytic manganese dioxide provide a novel manganese fertilizer having a fertilizer response that can operate both instantaneously and slow-release. A manganese fertilizer contains manganese byproducts and has 3 to 20 wt % citric acid-soluble manganese (C—MnO) and 0.5 to 7.0 wt % water-soluble manganese (W—MnO).

4 Claims, 2 Drawing Sheets

MANGANESE FERTILIZER

BACKGROUND OF THE INVENTION

This invention relates to a manganese fertilizer comprising manganese byproduct that is incidentally produced in the course of manufacturing electrolytic manganese dioxide and, more particularly, it relates to a manganese fertilizer that can operate both instantaneously and slow-release.

It is well known that manganese compounds are vital to the growth of plants. For instance, manganese can revitalize rice in eroded paddy fields and wheat, vegetables and fruits in sandy fields. However, adverse effects of excessive manganese are also known. Citrus and persimmon trees can become defoliated when manganese is excessively accumulated within them.

In the manganese compounds, water-soluble manganese compounds (hereinafter referred to as water-soluble manganese) are used as base fertilizer for growing rice, wheat and fruits or sprayed on them because of its readily available effect, although the effect quickly fades away and would not last long. On the other hand, manganese compounds soluble in citric acid (hereinafter referred to as "citric acid-soluble manganese") are effective as soil additives but fertilizer response operates very slow-release. In areas where manganese and manganese compounds are too scarce, the effect of citric acid-soluble manganese cannot become recognizable at all as soil additives even if they are given generously.

Known manganese fertilizers include water-soluble manganese fertilizer such as manganese sulfide fertilizer and citric acid-soluble manganese fertilizer such as manganese slag fertilizer as well as composite manganese fertilizers.

Manganese slag provides a popular source of manganese to be used for manganese fertilizers, the world deposit of ferromanganese slag available to the manufacture of manganese fertilizers is markedly decreasing because of the rapid growth in the demand for manganese typically in the form of ferroalloys of the manganese-related industries that are currently growing around the world. Therefore, additional sources of manganese need to be discovered for manganese fertilizers.

The inventors of the present invention have been engaged in discovering potential sources of manganese to be used for manganese fertilizers and come to know that manganese byproducts that are incidentally produced in the course of manufacturing electrolytic manganese dioxide provide a promising source of manganese. Such manganese byproducts have hitherto been simply disposed as industrial waste.

Electrolytic manganese dioxide is typically produced in a manner as described below by referring to FIG. 1 of the accompanying drawings. Firstly, manganese ore (manganese dioxide ore etc.) is roasted and crushed and then the crushed ore is dissolved into sulfuric acid. Note, however, that the source of manganese is not roasted if it is a source of manganese compounds that are soluble in acid such as manganese carbonate, ferromanganese and manganese nitride.

The solution is then neutralized and caused to pass a filter and the filtered solution is refined and subjected to an electrolytic process to produce electrolytic manganese dioxide. Byproducts containing manganese are normally obtained as solid residue left on the filter, which is then mixed with cement to make blocks so that they may be dumped for landfills as industrial waste. They have never been regarded as a source of manganese to be used for manganese fertilizers.

Therefore, it is a principal object of the present invention to provide a manganese fertilizer comprising manganese byproducts that are incidentally produced in the course of manufacturing electrolytic manganese dioxide.

Another object of the present invention is to provide a novel manganese fertilizer that can operate both instantaneously and slow-release.

SUMMARY OF THE INVENTION

As a result of a series of intensive studies intended to achieve the above objects, the inventors of the present invention acquired the following findings, which led to the present invention.

(1) Since manganese byproducts that have been disposed as industrial waste as described above contain both water-soluble manganese and citric acid-soluble manganese, they can provide an effective source of manganese to be used for a manganese fertilizer.

(2) Since such manganese byproducts contain both water-soluble manganese and citric acid-soluble manganese, they can provide an effective source of manganese to be used for a novel manganese fertilizer that can operate both instantaneously and slow-release.

Thus, according to the invention, there is provided (1) a manganese fertilizer comprising manganese byproducts produced in the course of manufacturing electrolytic manganese dioxide characterized in that it contains at least citric acid-soluble manganese (C—MnO) by 3 to 20 wt % and water-soluble manganese (W—MnO) by 0.5 to 7.0 wt %, (2) preferably, a manganese fertilizer as defined in (1) above being characterized in that said manganese byproducts are processed to become powdery or granular from the original cakey state, (3) still preferably, a manganese fertilizer as defined in (1) above being characterized in that it contains iron by 10 to 30% in terms of $Fe_2O_3$ along with minor element fertilizer substances such as $SiO_2$, Mo and B. The manganese fertilizer according to the invention can provide a novel material for composite fertilizers if it is used with one or more than one different fertilizer.

It is necessary for a manganese fertilizer according to the invention to be prepared in such a way that it comprises manganese byproducts and contains citric acid-soluble manganese (C—MnO) by at least 3 to 20 wt % and water-soluble manganese (W—MnO) by at least 0.5 to 7.0 wt %.

Therefore, according to the present invention, byproducts that have hitherto been disposed as industrial waste can be effectively utilized for a novel manganese fertilizer that can operate both instantaneously and slow-release.

Table 1 below shows a typical but not exclusive composition of a manganese fertilizer according to the invention.

TABLE 1

| Ingredients | Contents (%) |
|---|---|
| Total manganese ingredients (T-MnO) | 12.20 |
| citric acid-soluble manganese (C-MnO) | 10.59 |
| water-soluble manganese (W-MnO) | 5.80 |
| soluble manganese (S-MnO) (hydrochloric soluble) | 11.10 |
| Total potassium ingredients (T-$K_2O$) | 1.40 |
| citric acid-soluble potassium (C-$K_2O$) | 0.07 |
| water-soluble potassium (W-$K_2O$) | 0.04 |
| Total lime ingredients (T-CaO) | 1.55 |

TABLE 1-continued

| Ingredients | Contents (%) |
| --- | --- |
| soluble lime (SOCaO) (hydrochloric soluble) | 1.53 |
| Soluble silicate (S-SiO$_2$) (hydrochloric soluble) | 3.41 |
| Aluminum oxide (Al$_2$O$_3$) | 6.95 |
| Iron oxide (Fe$_2$O$_3$) | 22.50 |
| Moisture | 2.80 |

As shown above, a manganese fertilizer according to the invention contains citric acid-soluble manganese (C—MnO) by 3 to 20 wt %. If the content of citric acid-soluble manganese is less than 3 wt % in the fertilizer and it is still required to be effective, it needs to be given at an enormous rate to loose the cost effectiveness as fertilizer. If, on the other hand, the content of citric acid-soluble manganese exceeds 20 wt %, the manufacturing cost of such a fertilizer would become prohibitive and, if given to plants, their growth can be inadvertently obstructed by manganese. Therefore, the content of citric acid-soluble manganese is defined to be somewhere between 3 and 20 wt %, preferably between 8 and 10 wt %, for the purpose of the invention.

A manganese fertilizer according to the invention contains water-soluble manganese (W—MnO) by 0.5 to 7.0 wt %. If the content of water-solube manganese is lower than 0.5 wt % in the fertilizer, it would not operate instantaneously. If, on the other hand, the content of water-soluble manganese is in excess of 7.0 wt %, the growth of the plants given such a fertilizer can be inadvertently retarded by excessive manganese. Thus, the content of water-soluble manganese is defined to be between 0.5 and 7.0 wt %, preferably between 2.0 and 3.0 wt %, for the purpose of the invention.

A manganese fertilizer according to the invention preferably comprises manganese byproducts as defined above and processed to become powdery or granular from the original cakey state. If the fertilizers realized are in the form of powdery fine particles, they are sized to have an average diameter of 10 to 200 mesh, preferably 50 to 100 mesh, in order to optimize the effect of the fertilizer. If, on the other hand, the fertilizer is in the form of granules, it can advantageously be sprayed by means of a sprayer to cover an area with a half diameter of 5 to 15 m in a single spraying operation.

Now, a method of manufacturing a manganese fertilizer according to the invention will be described.

Firstly, the byproducts produced in the course of manufacturing electrolytic manganese dioxide are regulated at least for the manganese contents in a manner as described below so that they may contain citric acid-soluble manganese (C—MnO) by 3 to 20 wt % and water-soluble manganese (W—MnO) by 0.5 to 7.0 wt %. This provides a large difference from any conventional methods of manufacturing electrolytic manganese dioxide that are intended to minimize the manganese contents in the byproducts.

(1) In the neutralization step of the process of FIG. 1, the content of citric acid-soluble manganese is regulated by using a source of citric acid-soluble manganese such as MnO ore, MnCO$_3$ ore or a mixture thereof in place of an alkaline material such as CaO, CaCO$_3$ or Ca(OH)$_2$ that are normally used as neutralizing agents in conventional methods.

(2) In the extraction step of the process of FIG. 1, the content of citric acid-soluble manganese is regulated by controlling the reaction parameters such as the reaction time and temperature.

(3) The content of water-soluble manganese is regulated by controlling the cleaning conditions or the manganese sulfate concentration.

The byproducts obtained and regulated for the manganese contents in a manner as described above are then made loose to produce a powdery or granular manganese fertilizer. The reason why the obtained byproducts are made loose to become powdery without crushing is that they contain fine crystals when produced as extraction residue and/or neutralization deposit. The powdered byproducts are also effective as binder so that they may be effectively used to form grains if used with lignin and/or molasses as a granulation accelerator. This property of the byproducts is particularly effective in the manufacture of composite fertilizers.

A manganese fertilizer according to the invention may be regulated for its pH level, whenever necessary, by means of Ca(OH)$_2$ or CaO.

Since the iron content is removed by extraction in the course of manufacturing electrolytic manganese dioxide, Fe$_2$O$_3$ and minor amounts of other fertilizer substances such as SiO$_2$, Mo and B are also present in the fertilizer. Therefore, a manganese fertilizer according to the invention is also effective as a soil additive as well as a source of iron and other minor element fertilizer substances that can develop and grow roots and improve foliage in synergism with manganese.

DETAILED DESCRIPTION OF THE INVENTION

Figure 1:
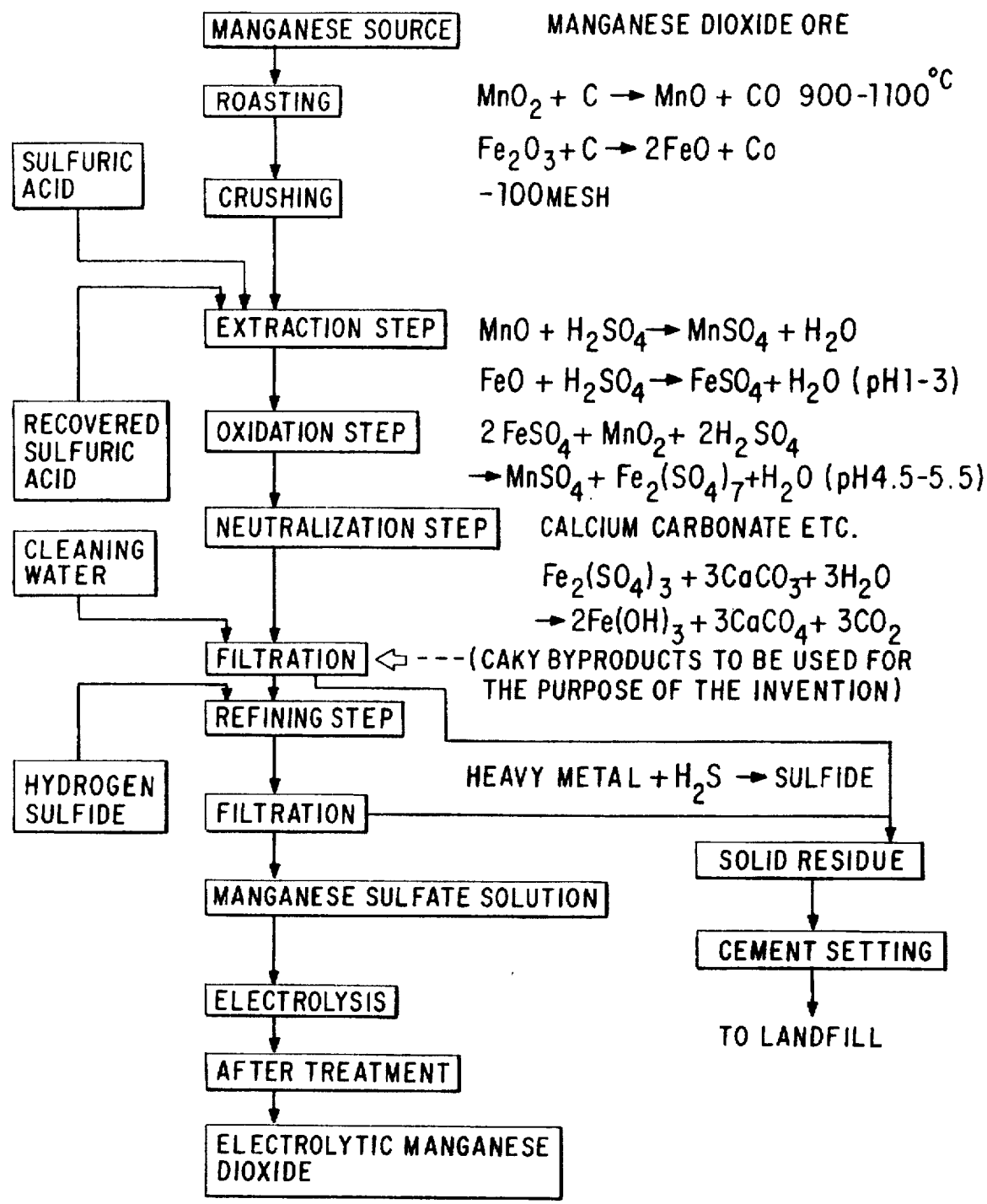
FIG. 1 is a flow chart of a process of manufacturing electrolytic manganese dioxide.

Now, the present invention will be described by way of Examples.

(Example 1)

Manganese byproducts used in this example contained at least both citric acid-soluble manganese and water-soluble manganese and were processed under conditions that allowed regulation of the contents.

300 kg of roasted manganese ore (Mn 60%) was poured into 8.0 m$^3$ of electrolytic solution (Mn concentration: 0.8 mol/liter, H$_2$SO$_4$ concentration: 0.4 mol/liter) contained in an FRP tank having a capacity of 10 m$^3$ and equipped with a batch agitator and the pH of the solution was regulated to 2.0 by means of 98% H$_2$SO$_3$ to cause them to react with each other at 90° C. for three hours in order to extract the manganese contents. In the neutralization step which was conducted in a conventional manner, they were neutralized sequentially by means of calcium carbonate (blank), MnO ore and a mixture of calcium carbonate and MnO ore (50/50) for 30 minutes for each until a pH level of 5.0 was obtained. The reaction products were filtered by means of a filter press having a filtering area of 50 m$^2$.

TABLE 2

| No. | Manufacturing parameters | | Contents (wt %) | |
| --- | --- | --- | --- | --- |
| | Neutralizer | cleaning water (liter) | citric acid-soluble | water-soluble |
| 1 | MnO ore | 2000 | 13.0 | 1.7 |
| 2 | | 1000 | 13.8 | 2.5 |
| 3 | | 500 | 16.4 | 5.1 |
| 4 | Calcium carbonate/ | 2000 | 9.0 | 1.6 |
| 5 | MnO ore = 50/50 | 1000 | 9.6 | 2.2 |
| 6 | | 500 | 11.9 | 4.5 |
| 7 | Calcium carbonate | 2000 | 1.0 | 1.0 |

N.B. Specimens 1 through 6 were prepared for the purpose of the present invention. Specimen 7 was prepared as a conventional fertilizer for comparison.

The amount of cleaning water was modified from the conventional 2,000 liter to 1,000 liter and then to 500 liter to force out cakey objects and the obtained manganese byproducts were analyzed for the citric acid-soluble manganese content and the water-soluble manganese content.

Table 2 above shows that the obtained manganese byproducts can be regulated for their citric acid-soluble and water-soluble manganese contents depending on the application of the fertilizer prepared in a manner as described above and containing the manganese byproducts.

(Example 2)

A Fertilizing Test on Spinacia oleracea (Available from Takii Shubyo)

The obtained manganese byproducts were dried and made loose to make fine particles and then used on Spinacia oleracea as a fertilizer in comparison with fertilizers of different types. Pots of Spinacia oleracea were used for the test.

(1) Ingredients

The table below shows some of the ingredients of the fertilizers used for the test.

| | Ingredients | | |
| --- | --- | --- | --- |
| Fertilizer | Citric acid-soluble manganese(C-Mno) (wt %) | Soluble manganese (S-MnO) (wt %) | Water-soluble manganese(W-MnO) (wt %) |
| Manganese byproducts (powdery) | 10.29 | — | 3.02 |
| Manganese carbonate (powdery) | — | 36.31 | — |
| Manganese sulfate (powdery) | — | — | 41.41 |

(2) Application Plan

The table below shows the amounts of the important ingredients of the fertilizer that each of the tested pots of Spinacia oleracea received. Note that an equal amount is given to all the tested pots for each ingredient except MnO, which was given either by 200 or by 400 mg.

| | | Ingredients (per pot) | | | | |
| --- | --- | --- | --- | --- | --- | --- |
| No. | Fertilizer | Total amt. g/pot | MnO (mg) | N (g) | $P_2O_5$ (g) | $K_2O$ (g) |
| 1 | Manganese | 1.94 | 200 | 0.7 | 0.7 | 0.7 |
| 2 | byproducts | 3.89 | 400 | 0.7 | 0.7 | 0.7 |
| 3 | Manganese | 0.55 | 200 | 0.7 | 0.7 | 0.7 |
| 4 | carbonate fertilizer | 1.10 | 400 | 0.7 | 0.7 | 0.7 |
| 5 | Manganese | 0.48 | 200 | 0.7 | 0.7 | 0.7 |
| 6 | sulfate fertilizer | 0.97 | 400 | 0.7 | 0.7 | 0.7 |
| 7 | No manganese | — | — | 0.7 | 0.7 | 0.7 |

N.B.: (1) Specimens 1 and 2 were prepared for the purpose of the present invention. Specimens 3 through 7 were prepared for the purpose of comparison.

(2) $N,P_2O_5$ and $K_2O$ were given in the form of high analysis compound fertilizer containing respectively 16 wt %, 16 wt % and 16 wt %.

(3) Application Method

Figure 2:
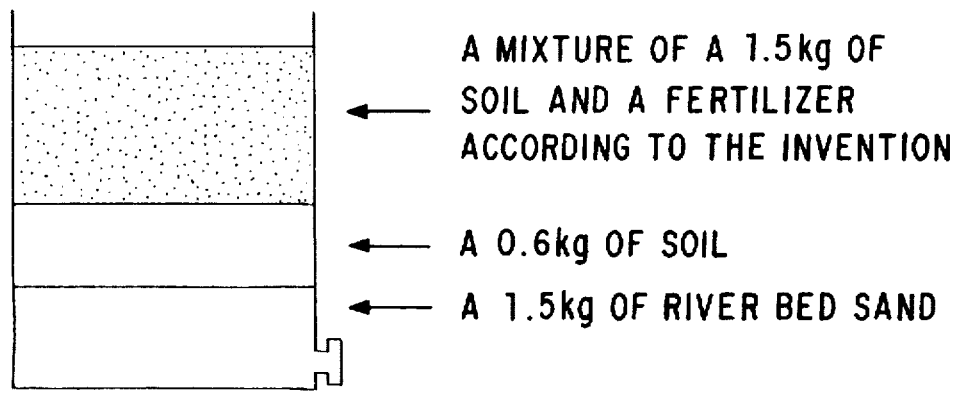
FIG. 2 is a schematic illustration showing how fertilizers are applied for Example 2.

The fertilizers were applied in a manner as illustrated in FIG. 2.

(4) Raising Schedule Spinacia oleracea in each of the pots was raised in accordance with the schedule shown below.

| | |
| --- | --- |
| pot filled with soil on | September 7, 1993 |
| fertilizer applied on | " |
| soil irrigated on (as in the field) | " |
| seeds sown on | " |
| sprouts thinned out on (to make 15 sprouts remain in the pot) | September 17, 1993 |
| harvested on | October 13, 1993 |
| (required number of days) | (37 days) |

Tables 3 and 4 show some of the results of the test.

(1) Growth and Yield (See Table 3)

No recognizable difference was observed among all the pots including the one where no manganese was used in terms of the growth and the surface yield (weight of stalks and leaves) of the plant and the leaves did not show any abnormal decolorization throughout the raising period.

(2) Manganese Absorption (See Table 4)

The plant absorbed manganese most effectively when given in the form of manganese byproducts for both MnO 200 and MnO 400, followed by a manganese sulfate fertilizer and a manganese carbonate fertilizer.

TABLE 3

| No. | Fertilizer | MnO (mg) | Av. glass height (cm) | | | | Av. leaf width (cm) | Av. sfc weight (g) |
| --- | --- | --- | --- | --- | --- | --- | --- | --- |
| | | | Sep. 24 | Oct. 2 | Oct. 7 | Oct. 13 | Oct. 13 | |
| 1 | Manganese | 200 | 13.2 | 18.5 | 20.5 | 24.5 | 4.4 | 93.2 |
| 2 | byproduct | 400 | 13.0 | 18.8 | 20.8 | 24.7 | 4.4 | 92.5 |
| 3 | Manganese | 200 | 13.5 | 19.3 | 21.8 | 25.3 | 4.5 | 95.0 |
| 4 | carbonate fertilizer | 400 | 13.5 | 19.5 | 20.8 | 24.8 | 4.3 | 94.1 |
| 5 | Manganese | 200 | 13.3 | 20.0 | 22.2 | 24.3 | 4.5 | 94.0 |
| 6 | sulfate fertilizer | 400 | 13.3 | 19.5 | 21.7 | 24.8 | 4.6 | 91.4 |
| 7 | No manganese | — | 12.8 | 18.5 | 20.5 | 23.7 | 4.1 | 91.0 |

N.B.: (1) Specimens 1 and 2 were prepared for the purpose of the present invention. Specimens 3 through 7 were prepared for the purpose of comparison.

(2) All of the figures were obtained by averaging the the values for three specimens.

TABLE 4

| No. | Fertilizer | MnO (mg) | Dry wt. (g) | MnO Concentration (ppm) | Absorbed amount (mg) | Rate of utl. (%) |
|---|---|---|---|---|---|---|
| 1 | Manganese | 200 | 7.12 | 611 | 4.4 | 1.5 |
| 2 | byproducts | 400 | 6.76 | 1022 | 6.9 | 1.4 |
| 3 | Manganese | 200 | 7.04 | 443 | 3.1 | 0.8 |
| 4 | carbonate fertilizer | 400 | 6.89 | 506 | 3.5 | 0.5 |
| 5 | Manganese | 200 | 7.05 | 503 | 3.5 | 1.0 |
| 6 | sulfate fertilizer | 400 | 6.80 | 829 | 5.6 | 1.0 |
| 7 | No manganese | — | 7.08 | 217 | 1.5 | — |

B.N.: (1) Specimens 1 and 2 were prepared for the purpose of the present invention. Specimens 3 through 7 were prepared for the purpose of comparison.

(2) The rate of utilization is expressed by the formula below. {absorbed amount of MnO (mg)—absorbed amount of MnO (mg) without giving manganese (mg)}×100/applied amount of MnO (mg)

(Example 3)

A Fertilizing Test on Tulip (Red Emperor)

In this example, three tulip roots were planted in each pot for a fertilizing test.

Dried and powdered manganese byproducts (citric acid-soluble manganese: 13.0 wt %, water-soluble manganese: 1.0 wt %) whose pH level had been regulated to 6.0 were given to a number of subject tulips at a rate of 4 g/pot. For the purpose of comparison, a solution prepared by dissolving 29 g of urea and 4 g of potassium phosphate ($KH_2PO_4$) (1 g in terms of P) into a liter of water (hereinafter referred to as solution A) was given to control tulips at a rate of 200 ml/pot and a mixture of the manganese byproducts and solution A was also given to different subject tulips.

Tables 5 and 6 below show the results of the test. As obviously seen from the tables, the manganese byproducts showed a remarkable effect in terms of greenness of leaf and bulb yield. The effect was particularly remarkable when used as a mixture of the manganese byproducts and solution A.

Table 7 shows the concentration of MnO absorbed by and found in the tested tulips. The high concentrations in the subject tulips are obviously attributable to the manganese fertilizer.

TABLE 5

| Fertilizer | Leaf greenness |
|---|---|
| Solution A | 100 |
| Manganese byproducts | 183 |
| Manganese byproducts + Solution A | 188 |

* Leaf greenness: Determined by means of a Minolta Chlorophyll Meter and expressed by referring to the reading on the control tulips, which was set to 100.

TABLE 6

| Fertilizer | Bulb yield (g/rt) | Av. no. of bulbs (no./rt) | Av. bulb weight (g/blb) |
|---|---|---|---|
| Solution A | 32.3 | 4.8 | 6.73 |
| Manganese byproducts | 33.9 | 5.11 | 7.51 |
| Manganese byproducts + solution A | 40.1 | 5.37 | 7.46 |

TABLE 7

| Fertilizer | Concentration of absorbed MnO (ppm) | |
|---|---|---|
| | leaf | bulb |
| Solution A | 192 | 68 |
| Manganese byproducts | 322 | 109 |
| Manganese byproducts solution A | 360 | 150 |

(Example 4)

A Fertilizing Test on Soybean

Dried and powdered manganese byproducts (citric acid-soluble manganese: 5.0 wt %, water-soluble manganese: 2.5 wt %) were given to a number of subject soybean roots in pots. For the purpose of comparison, a commercially available manganese carbonate fertilizer (soluble manganese: 36.0 wt %) and a commercially available fertilizer (N: 10 wt %, P: 18 wt %, K: 12 wt %) were given to respective control soybean roots in pots. The soybean roots were raised in a glass chamber.

(1) Variety of Soybean: Glycine amsoy (2) Each pot contained 280 g of soil and 2 soybean roots.

(3) The fertilizers were used as per Table 8 below.

(4) Raising Schedule

| June 18 | seed sowing |
|---|---|
| June 21 | transplanting |
| July 19 | fertilizer applying |
| November 26 | harvesting and weighing |

TABLE 8

| | Amount (g) | | | |
|---|---|---|---|---|
| | Commercial fertilizer * | byproducts (MnO: 200 mg/pot) | byproducts (MnO: 400 mg/pot) | commercial manganese carbonate fertilizer (MnO: 400 mg/pot) |
| A | 0.5 | 0 | 0 | 0 |
| B | 0.5 | 4.0 | 0 | 0 |
| C | 0.5 | 0 | 8.0 | 0 |
| D | 0.5 | 0 | 0 | 0.9 |

N.B.: (1) B and C denote the soybean roots raised by a fertilizer according to the invention and a commercial fertilizer, and A and D denote those raised by a commercial fertilizer alone and those raised by a commercial fertilizer and a commercial manganese carbonate fertilizer respectively.

(2) *The commercial fertilizer contained N by 10 wt %, P by 10 wt % and K by 1 wt %.

Table 9 below shows the results of the fertilizing test. As obviously seen, the byproducts (MnO: 400 mg/pot) proved to be the most effective of all. In other words, a manganese fertilizer according to the invention is superior to the commercially available manganese carbonate fertilizer.

TABLE 9

| | | No. of roots | soybean yield (g/pot) | weight of 100 soybean seeds (g) | weight of a seed (g/root) |
|---|---|---|---|---|---|
| A | Controls (commercial fert.) | 4 | 77.6 | 15.8 | 19.4 |
| B | Subjects (byproducts MnO: 200 mg/pot) | 4 | 108.4 | 19.5 | 27.1 |
| C | Subjects (byproducts MnO: 400 mg/pot) | 4 | 142.0 | 20.0 | 35.5 |
| D | Controls (commercial manganese carbonate ft.) | 4 | 92.8 | 19.6 | 23.2 |

(Example 5)

A Test of Manufacturing a Composite Fertilizer and Fertilizing Onshu Mandrin

A granular fertilizer was prepare by mixing 80 portions of a commercially available organic fertilizer (fish meal, N: 10.0 wt %, Phosphoric acid: 4.1 wt %) and 20 portions of manganese byproducts (citric acid-soluble manganese: 10.0 wt %, water-soluble manganese: 3.0 wt %). When analyzed, it proved to contain N: 7.9 wt %, Phosphoric acid: 3.0 wt % and citric acid-soluble manganese: 1.8 wt % and hence meet the requirements of a composite fertilizer. A test was carried out on Onshu mandarin (a variety of mandarin), using the above composite fertilizer and the above described organic fertilizer for the purpose of comparison.

(1) Veriety of mandarin: Miyata Early Ripening Type of Onshu 10 years old trees grown in pots
(2) Fertilizer: Composite fertilizer—A (containing manganese byproducts) organic fertilizer—B (for comparison)
(3) Raising Schedule

| July 20 | fertilizer applying |
|---|---|
| December 6 | harvesting |

FIGS. 10 and 11 show the weight and the sugar concentration of the harvested oranges. As obviously seen, the oranges raised by the composite organic fertilizer containing manganese byproducts were heavier and contained more sugar than those raised only the organic fertilizer.

TABLE 10

| Fertilizer | Av. No. of harvested oranges (no./tree) | Av. wt. of oranges (g/piece) | Av. sugar content (%)* |
|---|---|---|---|
| A: composite fertilizer containing manganese byproducts | 3.3 | 57.3 | 11.5 |
| B: commercial organic fertilizer | 2.6 | 35.9 | 10.1 |

*Average sugar content: the reading on the Brix scale

TABLE 11

| | Average sugar contents of differently sized oranges (%) | | |
|---|---|---|---|
| Fertilizer | large (60–80 g) | medium (40–60 g) | small (–40 g) |
| A: composite fertilizer containing manganese byproducts | 11.2 | 13.0 | 11.6 |
| B: commercial organic fertilizer | 10.3 | 10.7 | 9.6 |

As described in detail above, manganese byproducts that have been disposed as industrial waste can be utilized as fertilizer. Additionally, a novel manganese fertilizer that can operate both instantaneously and slow-release.

What is claimed is:

1. An inorganic fertilizer which contains solid residue including citric acid-soluble manganese (C—MnO) and water-soluble manganese (W—MnO), left after removing manganese content from a source of manganese by extraction, which is one of the steps in the course of manufacturing electrolytic manganese dioxide, $SiO_2$, $Al_2O_3$ and $Fe_2O_3$, said inorganic fertilizer comprising 3 to 20 wt % of said citric acid-soluble manganese (C—MnO) and 0.5 to 7.0 wt % of said water-soluble manganese (W—MnO), wherein said citric acid-soluble manganese and said water-soluble manganese are byproducts produced in the course of manufacturing electrolytic manganese dioxide, and wherein the wt % of said citric acid-soluble manganese and said water-soluble manganese is regulated by controlling said manufacturing parameters.

2. A manganese fertilizer according to claim 1, processed to a powdery or granular form from an original cakey state.

3. A manganese fertilizer according to claim 1, further comprising iron by 10 to 30 wt % in terms of $Fe_2O_3$ and minor amounts of other fertilizing substances.

4. A manganese fertilizer according to claim 3, wherein said other fertilizing substances are selected from the group consisting of $SiO_2$, Mo and B.

* * * * *